United States Patent [19]

Ensign

[11] Patent Number: 4,874,531
[45] Date of Patent: Oct. 17, 1989

[54] APPARATUS AND METHOD FOR SEPARATING WATER FROM AVIATION FUEL, AND FLOAT CONTROL THEREFOR

[75] Inventor: Harold W. Ensign, Fullerton, Calif.

[73] Assignee: Cla-Val Co., Costa Mesa, Calif.

[21] Appl. No.: 312,344

[22] Filed: Feb. 15, 1989

Related U.S. Application Data

[63] Continuation of Ser. No. 36,401, Apr. 9, 1987, abandoned.

[51] Int. Cl.$^4$ ............................................. B01D 17/12
[52] U.S. Cl. .................................... 210/744; 210/799;
210/86; 210/123; 210/172; 137/425
[58] Field of Search ............... 210/121, 122, 123, 124,
210/125, 126, 127, 128, 129, 86, 740, 744, 799,
172; 137/424, 425, 434

[56] References Cited

U.S. PATENT DOCUMENTS

| | | | |
|---|---|---|---|
| 1,555,082 | 9/1925 | Serrel | 137/425 |
| 2,261,234 | 11/1941 | De Lancey | 137/425 |
| 2,609,099 | 9/1952 | Griswold | 210/115 |
| 2,805,774 | 9/1957 | Griswold | 210/110 |
| 2,809,752 | 10/1957 | Leslie | 210/127 |
| 2,895,499 | 7/1959 | Nelson | 137/425 |
| 2,914,082 | 11/1959 | Meek | 137/425 |
| 3,957,638 | 5/1976 | Veld | 210/123 |
| 4,775,466 | 10/1988 | Abad et al. | 210/127 |

Primary Examiner—Richard V. Fisher
Assistant Examiner—Christopher Upton
Attorney, Agent, or Firm—Richard L. Gausewitz

[57] ABSTRACT

For use in combination with a system for separating water from pressurized fuel in a filter-separator tank, there is provided a float valve and weight device that prevents fuel from leaving the tank if the interface between fuel and water is at an undesirably high elevation. The float of the float valve is associated with a weight, the relationships being such that the float floats at the interface. To test the float for waterlogging, and to test the entire system, the association between float and weight is discontinued. The float then floats up unless waterlogging has occured.

21 Claims, 7 Drawing Sheets

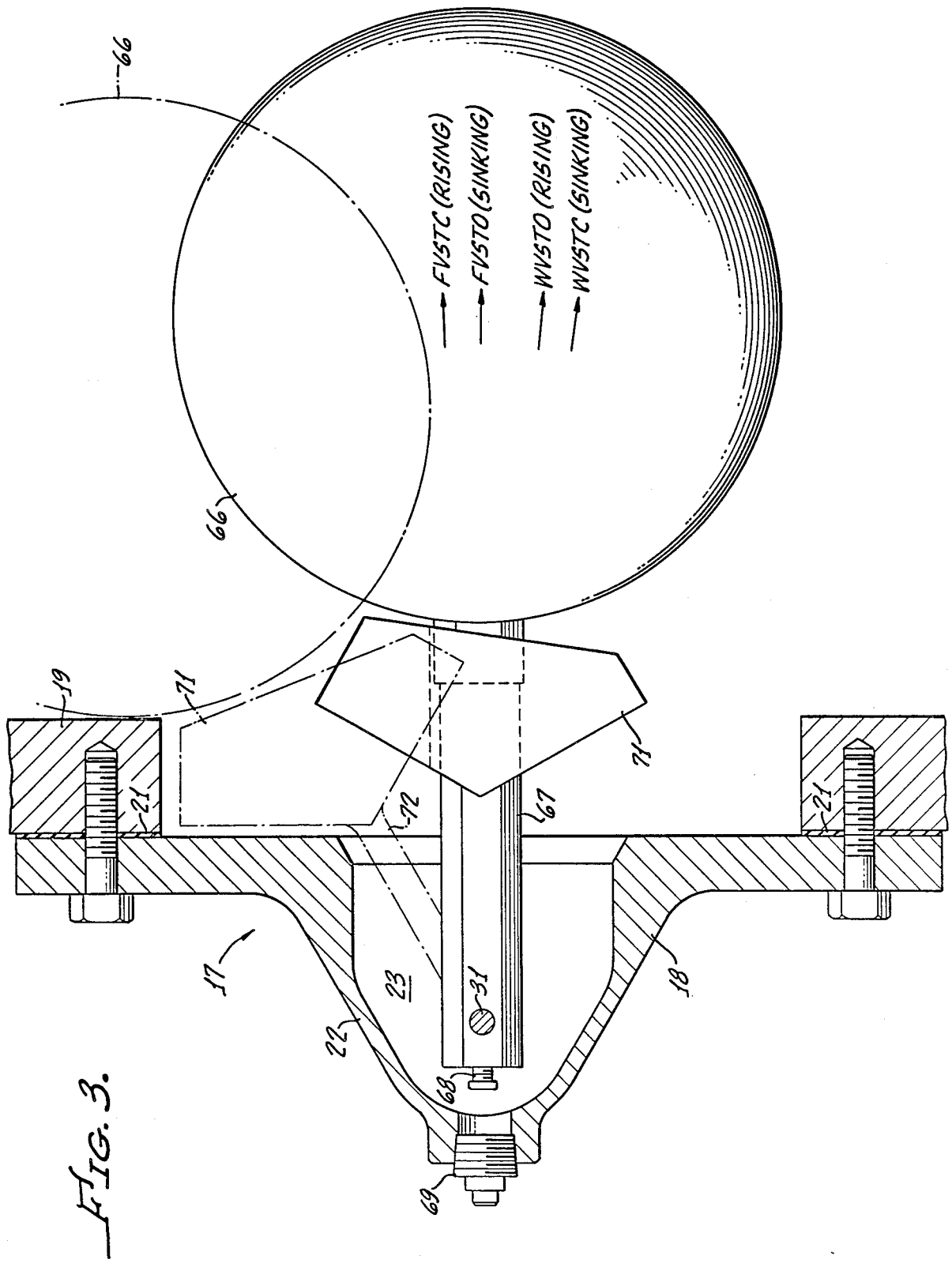

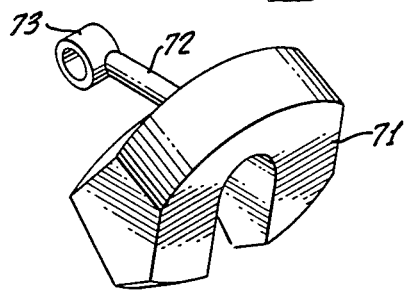
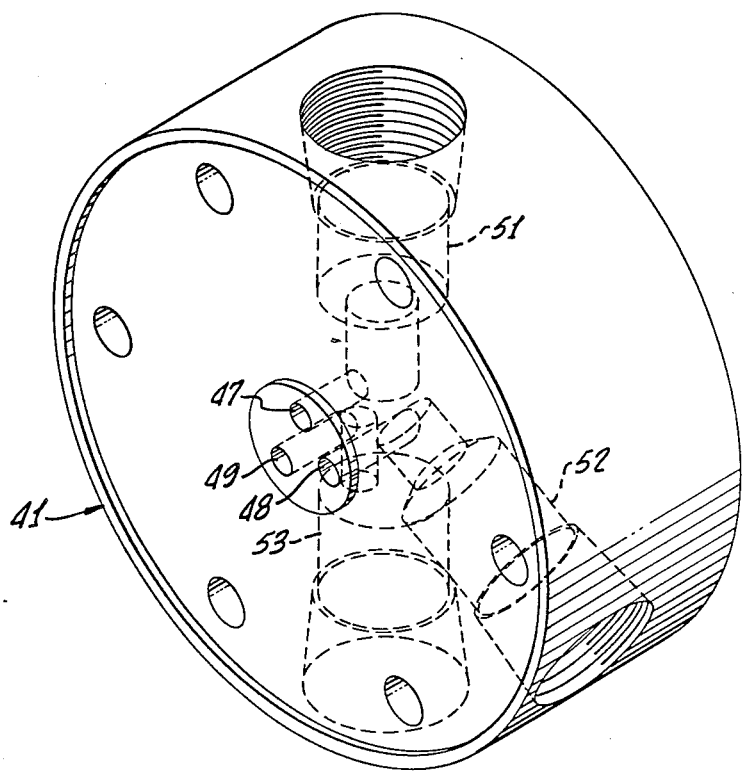
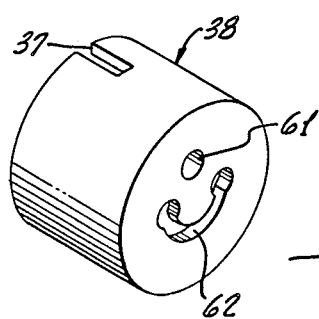

APPARATUS AND METHOD FOR SEPARATING WATER FROM AVIATION FUEL, AND FLOAT CONTROL THEREFOR

CROSS-REFERENCE TO RELATED APPLICATION

This application is a continuation of prior application Ser. No. 036,401, filed Apr. 9, 1987, for "Apparatus and Method for Separating Water from Aviation Fuel, and Float Control Therefor," now abandoned.

In accordance with the present apparatus and method for separating water from aviation fuel, there is provided a practical, efficient and economical weight and weight-operating system which make it possible and practical for the operator to make certain that the float of the system, and its associated components, are in perfect operating condition, for example that the float has not become waterlogged and thus inoperative.

SUMMARY OF THE INVENTION

In accordance with one aspect of the invention, a removable weight is operatively associated with the float, the amount of the weight being so selected that flow of fuel out of the filter separator will be shut off when the water level in the sump becomes excessively high, and also so selected that the drainage of liquid from the sump will be shut off when the water level in the sump becomes low. The method further comprises removing such weight from its association with the float, thus testing the system for buoyancy of the float, operativeness of all valve elements, etc.

In accordance with an aspect of the preferred embodiment of the invention, the weight is not mounted on the float itself, but instead is provided on the arm that tethers the float. The amount of the weight, and the moment arm of the weight relative to the pivot axis for the float, are selected to achieve the above-specified results.

In accordance with other aspects of the invention, there is provided a weight-elevating means that lifts the weight when desired, and that can be stowed away to prevent any possibility that the weight-elevating means will interfere with operation of the float. Such other aspects include, also, isolating the weight-elevating means from the valve-actuating elements operated by the float, to prevent undesired interaction therebetween.

BRIEF DESCRIPTION OF THE DRAWINGS

FIG. 3 is a vertical sectional view on line 3—3 of FIG. 2, showing the float ball and associated weight mechanism;

FIG. 5 is an isometric view showing the weight and its arm;

FIG. 6 is a view showing the distributor element in large scale;

FIG. 7 is a view showing the disc associated with the distributor, and in the same scale as that of FIG. 6.

DETAILED DESCRIPTION OF THE PREFERRED EMBODIMENT

Figure 1:
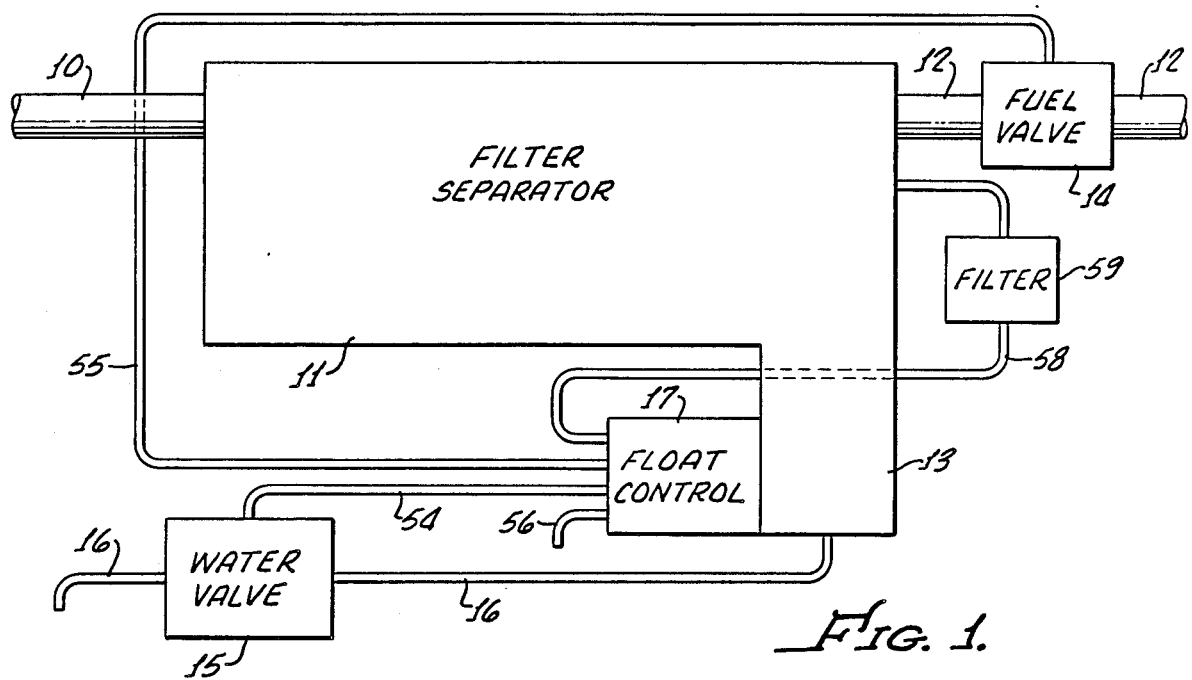
FIG. 1 is a schematic illustration of a fuel-water separator system incorporating the present invention.

Referring first to FIG. 1, there is shown a type of system for separating water from aviation fuel, such system having long been known in the art. For example, U.S. Pat. Nos. 2,609,099 and 2,805,774 shows such a system. The disclosures of such patents are hereby incorporated by reference herein.

Aviation fuel enters via a pipe 10 into a filter separator tank 11, and then leaves the tank through a pipe 12. Water that is separated from the aviation fuel by the filter separator 11 drops into a sump 13. It is the purpose of the system and of the present invention to guarantee that there is never too much water in the sump 13 and filter separator 11, that water never emanates through pipe 12, and that no significant amount of fuel emanates from any pipe other than 12.

There are two valves that provide such assurance, but only when the valves are properly operated by a substantially fail-safe mechanism as described below. The first valve is a fuel valve 14, such valve being incorporated in pipe 12 and being closed when the amount of water in sump 13 becomes alarmingly high. The second valve is a water valve 15, and it drains water through a pipe 16 from sump 13 so long as there is a sufficient amount of water in the sump. When there is little or no water in sump 13, water valve 15 is closed to prevent wastage of the aviation fuel.

Fuel valve 14 and water valve 15 are, preferably, diaphragm valves of a type well known in the art. Preferably, each diaphragm valve is such that the valve remains open at all times except when pressurized fluid is injected into a chamber above the diaphragm, thus forcing the diaphragm (or an element connected thereto) onto the valve seat. The valve then remains closed until the chamber above the diaphragm is drained or vented, at which time the pressure in the system forces the valve-closing element off of its seat so that flow through the valve is resumed.

to achieve substantially fail-safe operation of the fuel and water valves 14 and 15, respectively, an improved float-operated control system 17 is associated with sump 13. As in prior-art float-operated control systems, there is a float-ball (or other shape of float) in sump 13, and such ball controls valve or pilot elements that either supply pressure to, or drain, the diaphragm chambers of valves 14 and 15 in response to the position of the float. In accordance with the present invention, there is provided a practical, efficient and economical weight and weight-operating system which make it possible and practical for the operator to make certain that the float and its associated components are in perfect operating condition, for example that the float has not become water-logged and thus inoperative.

Figure 2:
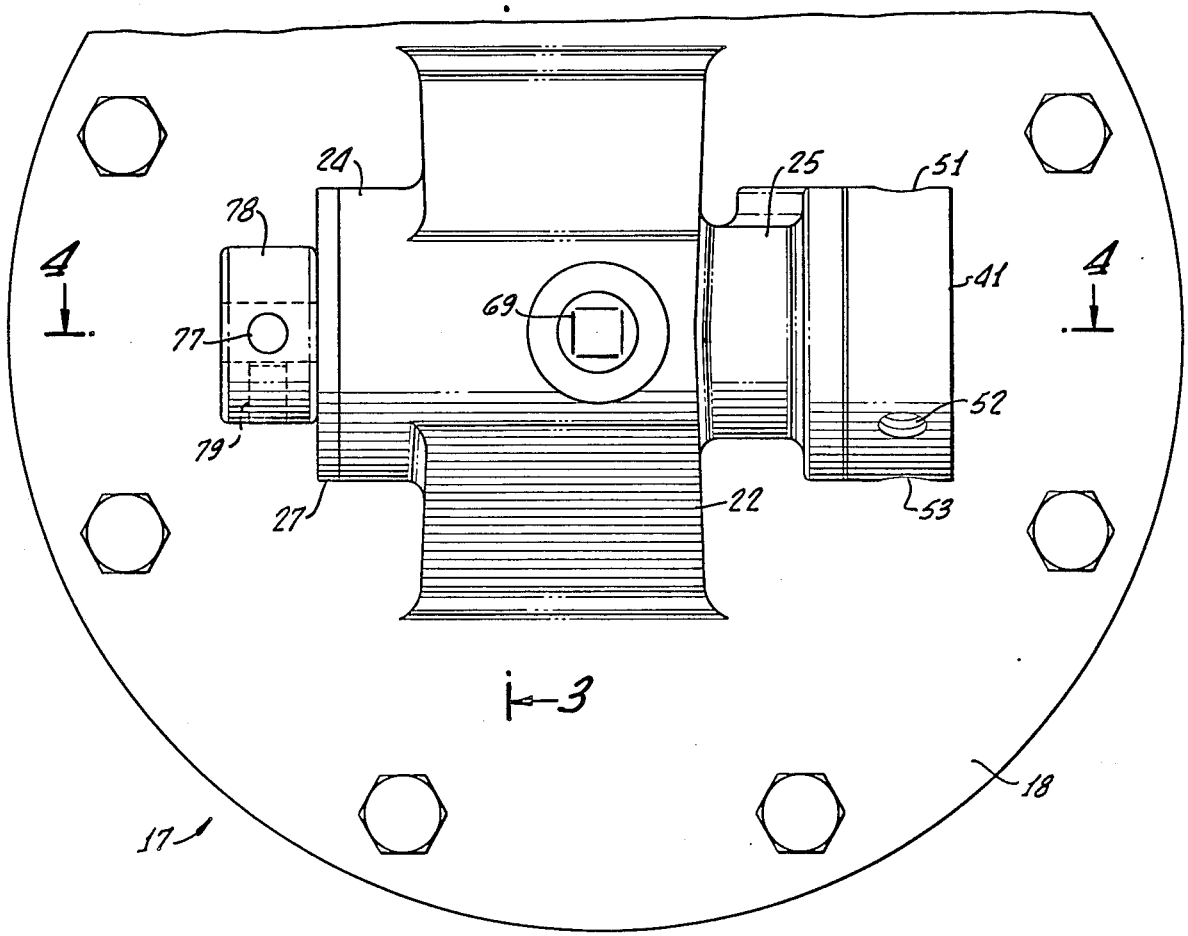
FIG. 2 is a vertical elevational view of the float control apparatus looking from the exterior of the sump.

Referring particularly to FIGS. 2 and 3, float control 17 has a housing 18 that is generally disc-shaped except at the central region. The periphery of the disc is secured by screws to a wall 19 of sump 13, covering an opening in such wall, there being a gasket 21 provided as shown in FIG. 3 to prevent leakage of the high-pressure aviation fuel out of the filter separator 11 and sump 13. The fuel may be, for example, at a pressure of 150 psi.

At its central region, the housing 18 has an outwardly-protuberant wall portion 22 that defines a chamber 23. Extending horizontally from both sides of the wall portion 22, in coaxial relationship relative to each other, are generally cylindrical boss portions 24 and 25 adapted to receive operating and control valve or pilot means described subsequently.

A bearing 26 is inserted into the left boss 24, having a flange 27 secured by screws 28 (FIG. 4) to such boss. Extending through bearing 26 is a shaft 29, and this shaft has an axial bore in the right end thereof to receive, in freely-rotatable relationship, part of the stem 31 of a driver assembly for the control valve or pilot means. Such stem extended across chamber 23 and through an internal bearing 32 that is formed integrally with housing 18, the stem protruding toward the right from such internal bearings.

There is nonrotatably secured on the right end of the stem 31, as by being press-fit over knurls on such stem end, a drive element 33. The left end of the drive element engages a disc-shaped thrust bearing 34. A roll pin 36 extends diametrically through the drive element 33 and also through a hole in the stem 31, and only one end of such roll pin extends outwardly from the drive element for performance of a driving function.

Stated more specifically, the outwardly-extending end of the roll pin 36 is disposed in a notch 37 (FIGS. 4 and 7) in the rim portion of a disc 38. Such rim extends to the left as viewed in FIG. 4, and the interior cylindrical surface of the rim extends around on the exterior cylindrical surface of driver 33. A helical compression spring 39 is disposed within the rim of disc 38, and tends to force the bottom of the disc (the right end thereof) toward the right due to compressive forces exerted between such bottom end and the right end of the driver 33.

The force of spring 39, and (more importantly) fluid pressure, force the disc 38 against a distributor 41 (FIGS. 4 and 6) that is secured by screws 42 (FIG. 4) to the right end of boss 25, there being a suitable gasket interposed to prevent leakage. Leakage from other parts of the system shown in FIG. 4, during testing of the mechanism and/or during operation thereof, is prevented by suitable O-rings 44–46.

As shown in FIG. 6, distributor 41 has three axial ports 47–49 that connect, respectively to radial passages 51–53. Port 47 and its passage 51 connect through a conduit 54 (FIG. 1) to the diaphragm chamber of water valve 15. Port 48 and its passage 52 connect through a conduit 55 to the diaphragm chamber of fuel valve 14. Port 49 and its passage 53 connect through a conduit 56 to a suitable drain.

Figure 4:
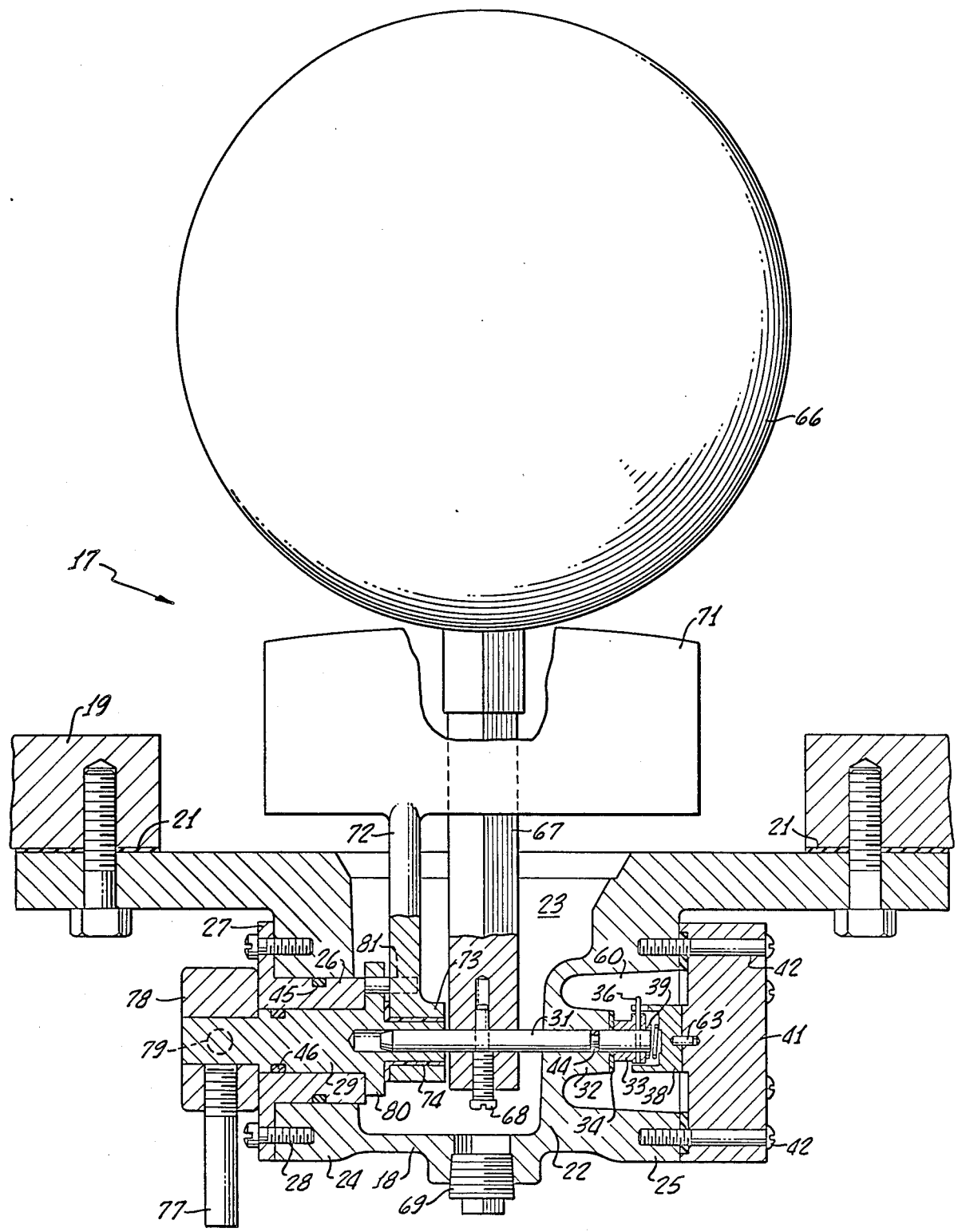
FIG. 4 is a horizontal sectional view on line 4—4 of FIG. 2, showing the weight and weight-actuator mechanism and also showing the valve-controlling means.

A supply or pressure conduit 58, preferably having a filter 59 therein as shown in FIG. 1, is connected to a portion of filter separator 11 where the fuel is clean and free of water. The other end of such conduit connects to a port in boss 25 of housing 18, and thus to a chamber 60 (FIG. 4) defined by such boss. Accordingly, pressurized fuel surrounds the disc 38 and is present within the rim of the disc. Such fuel can pass through a port or passage 61 (FIG. 7) in the disc to the extreme right end thereof. It can thus conduct fuel to one of the ports 47 and 48 in the distributor 41 when the disc is in certain positions relative to the distributor. The disc 38 also has an arcuate groove 62 in the right (FIG. 7) end thereof, and this accurate groove is adapted at certain positions to connect the water port 47 and/or fuel port 48 to drain port 49. A pin 63 extends axially of the disc and distributor, as shown in FIG. 4, and serves to center the disc relative to the distributor.

To rotate the stem 31 and thus disc 38 to determine the registration of registry of the described ports and groove, a float ball (or other-shape float) 66 is disposed in sump 13. Securely connected to the float ball, along an extended diameter thereof, is an arm 67 that is preferably hexagonal in cross section and that has a bore therethrough (between opposed flat surfaces of the arm) to receive the above-described stem 31. The stem 31, in turn, has a bore therethrough to receive the inner end of a locking screw 68. Stated more definitely, the outer end of arm 67 is axially bored and counter bored, and the locking screw 68 is threaded into the counter bore so that a reduced-diameter inner end of the locking screw projects through the transverse bore in stem 31 and locks the stem against rotation relative to the float arm. Thus, the ball 66 and its arm drive stem 31 rotationally in accordance with the position of the float. To provide access to the locking screw 68, a cap 69 is provided on housing 18 directly outwardly of such screw.

The Weight and Weight-Actuating Mechanism Associated with Arm 67 and thus with Float 66

A weight 71, having a precisely-determined mass and moment arm, is mounted so as to seat on the float-ball arm 67. As shown in FIG. 5, the preferred weight 71 is U-shaped, with the arms of the U extending downwardly and spaced from opposite surfaces of the float-ball arm 67. The center of the base of the U seats on the upper surface of arm 67, being held in such position by a or weight arm crank 72. Such crank or weight arm, as best shown in FIG. 4, normally extends parallel to float-ball arm 67 and laterally spaced therefrom, terminating at a bearing portion 73. Such bearing portion surrounds a low-friction bushing 74 on a necked-down portion of shaft 29 that is adjacent the float-ball arm 67.

The weight 71 is so shaped, and the crank or weight arm 72 has such length, that the weight may pivot upwardly until it is adjacent the housing (FIG. 3). The weight 71 does not engage the wall 19 of the sump, and is preferably in the opening in such sump wall. Reference is made to FIG. 3, which shows in phantom lines the extreme upward-pivoted position of the ball 66 and weight 71.

Means are provided to lift the weight 71 off the float-ball arm 67, or to lift the weight so that the ball follows it upwardly due to buoyant forces. Such means comprise a weight-actuating crank 77 (FIG. 4) that is secured radially in a boss 78. The boss, in turn, is non-rotatably secured to the left end (FIG. 4) of shaft 29, as by a set screw 79. Inwardly adjacent the liner end of bearing 26, shaft 29 has a flange 80 one portion of which protrudes toward the weight 71. Fixedly mounted in such protruding flange portion, and extending longitudinally of shaft 29 to a position beneath crank 72 for the weight 71, is a lift pin 81. Preferably, the relationships are caused to be such that the upper surface of lift pin 81 is in engagement with the underside of crank 72 when the weight-actuating crank 77 is parallel to float-ball arm 67.

When the crank 77 is actuated downwardly by an operator, shaft 29 is rotated so as to cause the lift pin 81 to operate against the underside of weight arm 72 and thus lift weight 71. The ball then floats upwardly, unless it is waterlogged, and the system is tested as described subsequently.

It is pointed out that the lifting of the weight due to operation of crank 77 and consequent rotation of shaft 29 does not itself rotate stem 31 and thus cause operation of the valve-controlling or pilot elements at the right portion of FIG. 4. It is only when the ball 66 floats upwardly, so that the float-ball arm 67 rotates stem 31, that such a valve-controlling elements at the right end of FIG. 4 are operated.

Stated otherwise, there is relative isolation between the weight-lifting mechanism and the valve-control mechanism, this being caused by the low friction relationship between bearing 73 and bushing 74, and by the relatively free-rotation relationship between shaft 29 and stem 31.

Description of the Method, and Further Description of Operation

In accordance with one aspect of the method, a removable weight is operatively associated with the float ball 66, the amount of the weight being so selected that the flow of fuel out of the filter separator 11 will be shut off when the water level in the sump becomes excessively high, and also so selected that the drainage of liquid from the sump will be shut off when the water level in the sump becomes low. The method further comprises removing such weight from its association with the float ball, thus testing the system for buoyancy of the float ball, operativeness of all valve elements, etc.

In accordance with another aspect of the invention, the weight is not mounted on the float itself (it being emphasized that the float does not need to be ball shaped), but instead is provided on the arm that tethers the float. The amount of the weight, and the moment arm of the weight relative to the pivot access for the float, are selected to achieve the above-specified results.

In accordance with other aspects of the method, there is provided a weight-elevating means that lifts the weight when desired, and that can be stowed away to prevent any possibility that the weight-elevating means will interfere with operation of the float ball. Such other aspects include, also, isolating the weight-elevating means from the valve-actuating elements operated by the float-ball, to prevent undesired interaction therebetween.

The preferred system is one in which the float-ball, having weight 71 operatively associated therewith, floats with its central horizontal plane or center line (or, less preferably, other reference line) at the interface between fuel and water. Stated otherwise, the float ball 66 has its lower half in the water and its upper half in the fuel, provided there is sufficient water in the sump. When the ball floats with its center at the interface, there are substantially equal torques exerted on stem 31 in the upward and downward directions. When an amount of water is drained out of the sump (by a separate drain system, not shown) to cause the water to be below the float ball, such ball (with weight 71 thereon) sinks in the fuel.

Figure 3A:
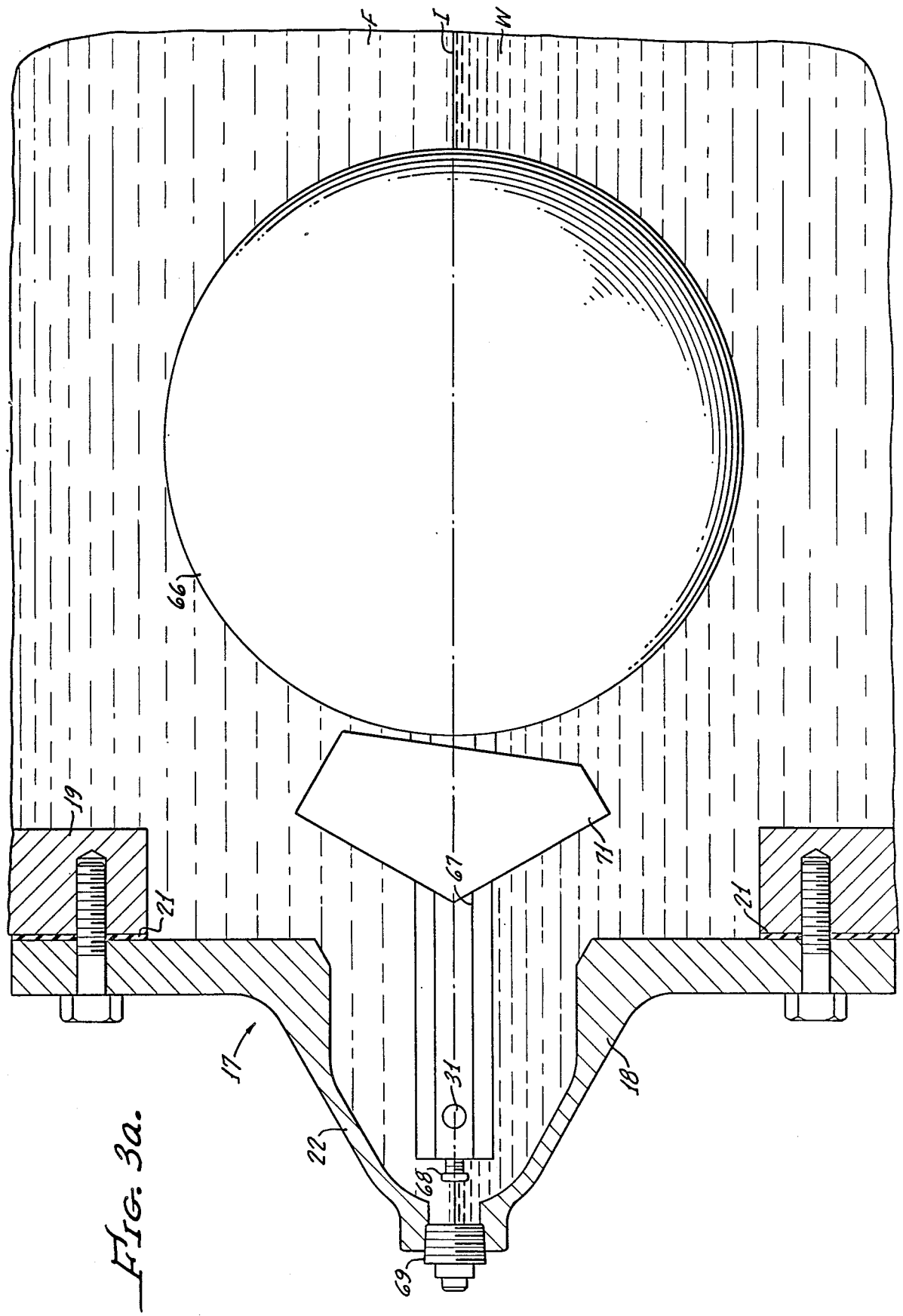
FIG. 3a corresponds to the solid-line position of FIG. 3, and also shows the water and fuel and the interface therebetween.

FIG. 3a shows the interface I between the water W and the fuel F, such interface being at the central horizontal plane of the ball as above stated.

Ball 66 is made sufficiently large to assure that there will be sufficient moment in both upward and downward directions to effect operation of the valve-controlling means even if such means have (on occasion) relatively high friction. The ball may be, for example, 5 inches in diameter. Even with a ball of this size, the net bouyant forces are small, about 2 ounces.

The weight is brought to an exact value by drilling holes therein or removing portions thereof, so that a precise value of weight is achieved. Less preferably, the moment arm of weight 71 on float-ball arm 67 may be varied so as to achieve the desired torque. The relationships are such that when the weight is lifted, there is simulated the change in flotation or buoyancy forces of the ball between fuel and water.

Figure 8:
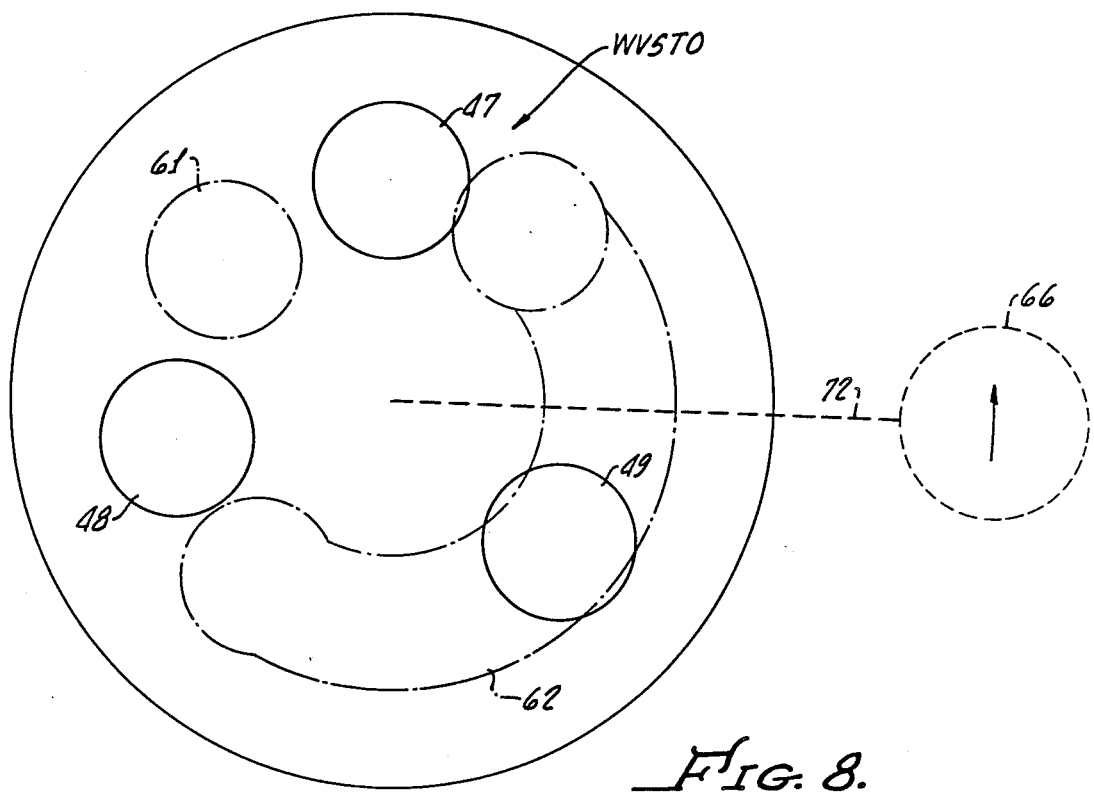
FIGS. 8-11, inclusive, are schematic views, not to scale, showing the positions of the valve-controlling means at certain times when the float is moving upwardly or downwardly, the views being from the right in FIG. 4.

When the amount of water in sump 13 rises until the ball is in the position marked by the legend "WVSTO (RISING)" in FIG. 3, the valve-controlling elements are in generally the position shown in FIG. 8. The arcuate groove 62 then becomes registered with port 47 as well as with port 49, which causes diaphragm-pressurizing fuel from water valve 15 to drain through conduit 54 and out conduit 56, so that the water valve opens.

Figure 9:
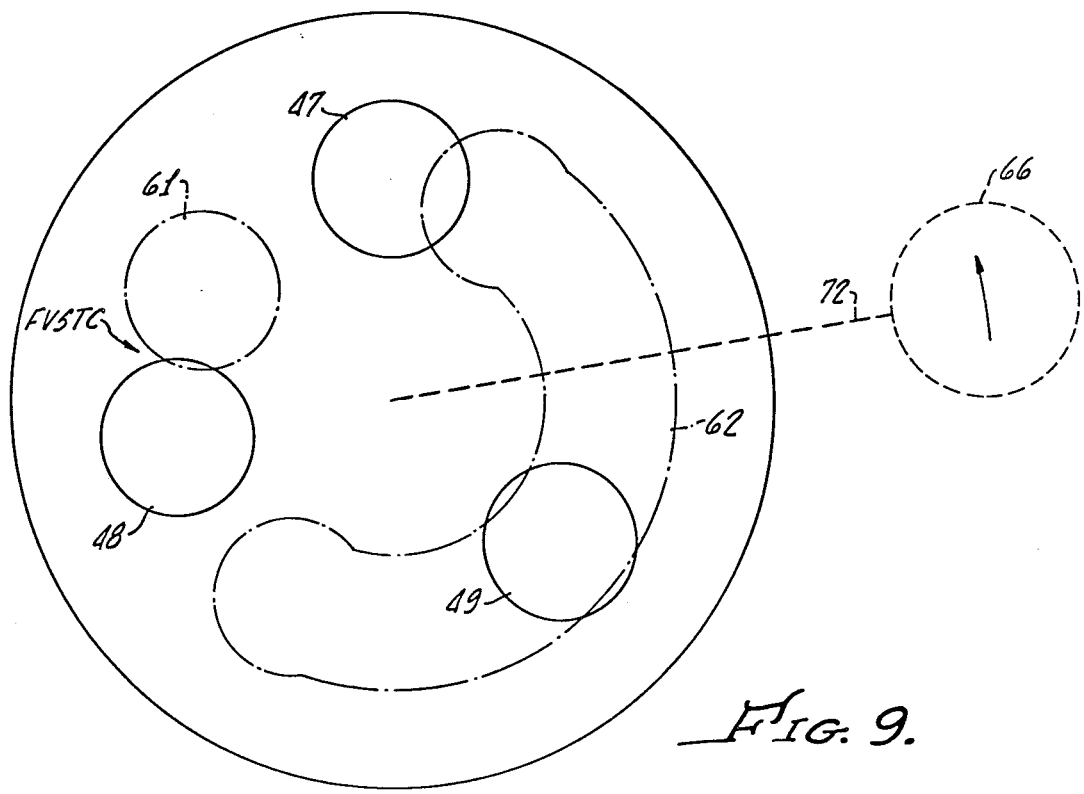

If the water level continues to rise, for example due to an excessive inflow of water, the float ball 66 rises until generally the position shown in FIG. 3, marked "FVSTC (RISING)", is reached. The valve-controlling or pilot means are then generally in the FIG. 9 position. This means that the fuel valve 14 starts to close, because supply port 61 becomes registered with port 48. It is thus assured that no fuel containing water can get out of the filter separator 11 and be conducted to the airplane.

Figure 10:
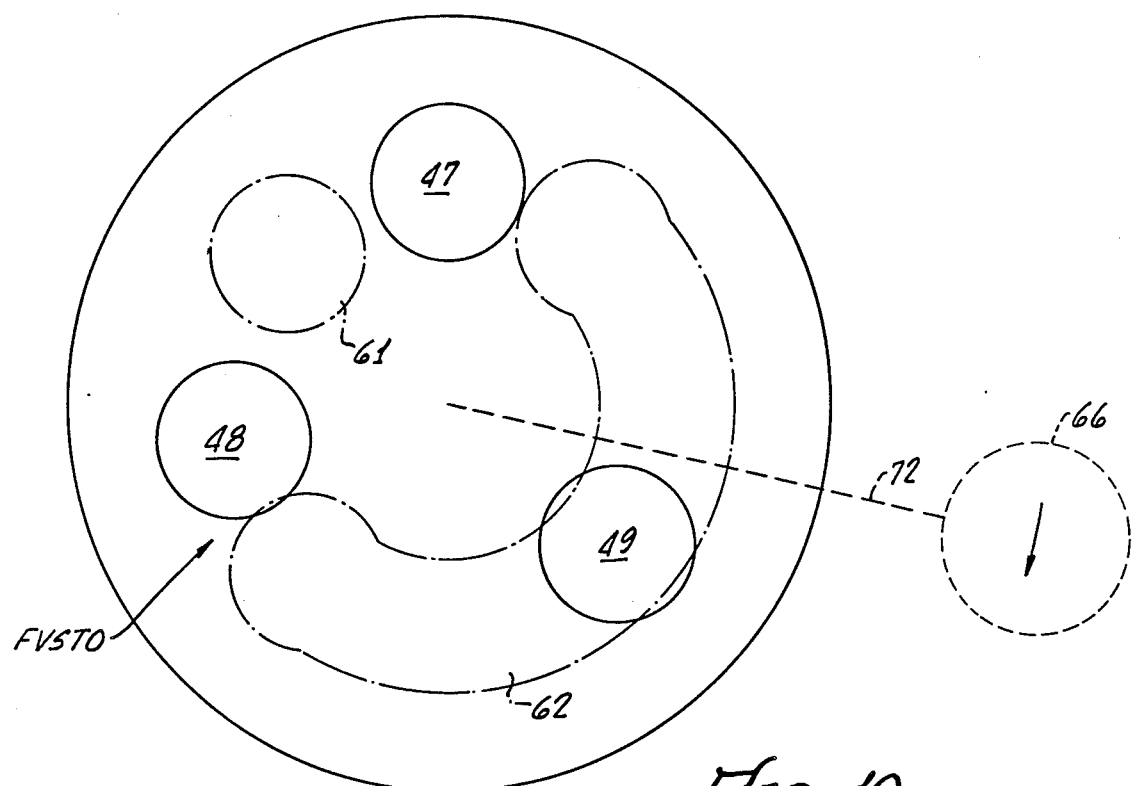

Let it next be assumed that the water level starts to drop, until the float ball sinks to the position marked (FIG. 3) "FVSTO (SINKING)". This corresponds generally to the valve-operator position shown in FIG. 10, and is such that fuel drains through conduit 55 from valve 14, then through port 48, then through the arcuate groove 49 to conduit 56, so that valve 14 opens and passage of fuel through the system starts.

Figure 11:
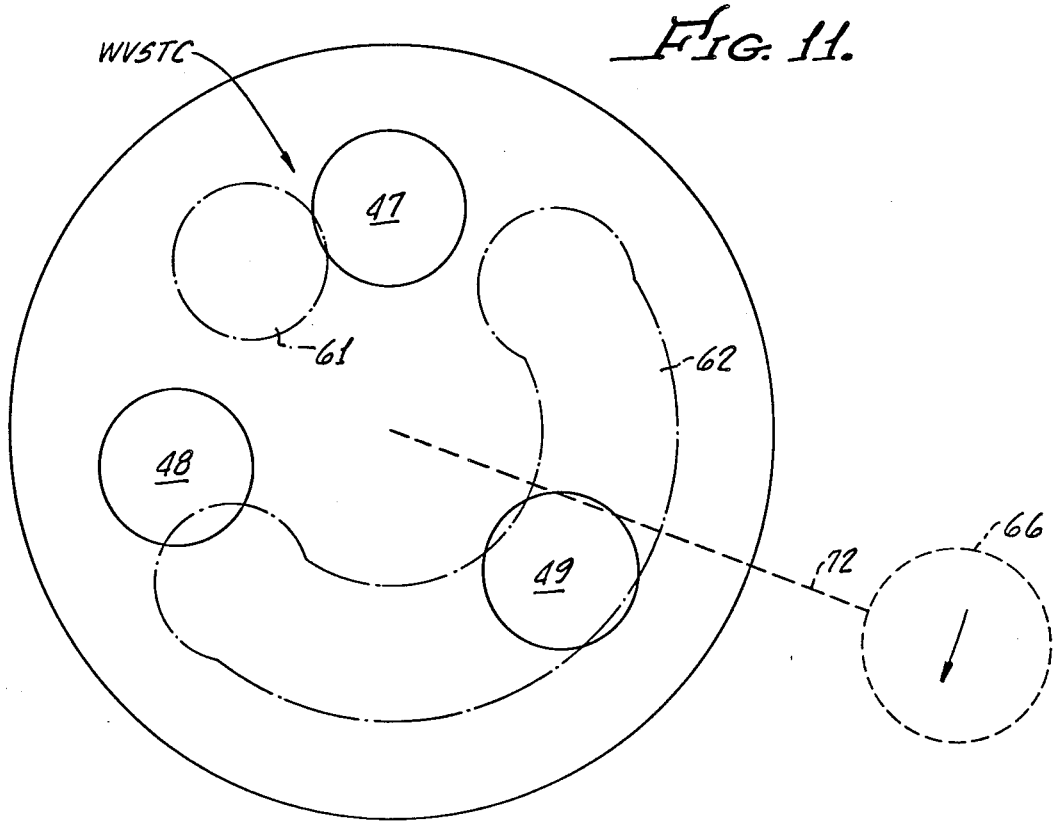

When the amount of water in the sump reduces to such a level that the float ball 66 is in the position marked (FIG. 3) "WVSTC (SINKING)", the valve operator elements are generally in the position shown in FIG. 11. The supply port 61 is then registered with port 47 to pressurize the conduit 54 and thus close the water valve 15. It is thus assured that no fuel can drain from the sump and be wasted.

It is pointed out, relative to FIG. 3, that the range of movement of the float ball 66 is quite small when the system is functioning normally as it is almost always the case. The float-ball then floats with its center (preferably) at the interface between fuel and water, and is half in fuel and half in water. It is only in the event of malfunction, or draining of the sump, or when no substantial water has ever entered the system, that ball positions above or below those shown in FIG. 3 come into play.

To test the system, the operator grasps the weight-actuating crank 77 (FIG. 4) and pivots it clockwise (as viewed from the left in FIG. 4) until the lift pin 81 engages and lifts the arm 72 for weight 71. This causes the float ball to be buoyed up so that its arm 67 follows the weight 71.

When the ball floats up, it simulates a rising water level in the system, the result being that water valve 15 opens and fuel valve 14 closes. The operator knows that such valves are thus operating, because he can see and/or hear them work.

The operator then releases the crank 77, so that weight 71 engages float-ball arm 67 and forces it downwardly despite the buoyant effect of ball 66. The operator then observes and/or hears that the fuel valve opens and the water valve closes.

After the testing is completed, the operator pivots the crank 77 upwardly and forwardly until it is engaged with the housing 18. Such pivotal movement moves the lift pin 81 far away from crank 72, making sure that there is no interaction between the weight-lifting means and the ball and its arm. However, it is pointed out that in the event an operator forgets to thus "stow" the crank 77 near the housing, the amount of friction in the weight-lifting system is so low, and the amount and torque arm of weight 71 are sufficient, that the system will still function.

It is pointed out that the ball cannot be just a little waterlogged, because the pressure in the filter separator is high, e.g. 150 psi as stated. Since the ball has an interior that is hollow and is at atmospheric pressure, even a very small hole in the ball will cause much fuel to enter the ball and waterlog it substantially. Such waterlogging will be readily detected by the present system.

The foregoing detailed description is to be clearly understood as given by way of illustration and example only, the spirit and scope of this invention being limited solely by the appended claims.

I claim:

1. In combination with a system for separating water from fuel,
   (a) a filter-separator tank constructed and arranged to contain pressurized fuel and, when water has entered said tank, also constructed and arranged to contain pressurized water,
      said water being below said fuel, there being a horizontal interface between said water and said fuel,
   (b) float means disposed in said tank and constructed and arranged to control the outflow of fuel from said tank to stop said outflow when said interface becomes excessively high,
   (c) weight means operatively associated with said float means,
      said weight means and said float means having such relationship to each other that said float means will float at said interface between fuel and water in said tank, and
   (d) means, independent of said float means, to discontinue the operative association between said weight means and said float means so as to permit said float means to rise
      and to inform an operator if said float means does not rise, that said float means is waterlogged.

2. The invention as claimed in claim 1, in which means are provided to drain water from said tank in response to elevation of said float means above a predetermined level.

3. A float control for apparatus for separating water from aviation fuel, said control comprising:
   (a) float means,
   (b) arm means connected to said float means,
   (c) control means, responsive to movement of said arm means, operatively connected to valve means forming part of the apparatus for separating water from aviation fuel,
   (d) weight means operatively associated with said float means and with said arm means,
      the association of said weight means with said float means and said arm means being such that, during operation of the float control, the weight of said weight means is added to the weight of said float means and the weight of said arm means in opposing a buoyant force exerted by said float means,
      the combined weights of said float means, arm means and weight means being such that said float means floats an interface of the water and aviation fuel in the system, the buoyant force exerted by said float means being sufficiently great that said float means floats up and elevates said arm means when the operative association of said weight means with said float means and said arm means is discontinued, and
   (e) test means independent of said float means to discontinue the operative association of said weight means with said arm means and said float means, thereby causing said float means to float up unless waterlogging of said float means has occurred, to thereby test the float control to determine whether or not there has been waterlogging of said float means.

4. The invention as claimed in claim 3, in which said float means is a substantial sphere, and in which the central horizontal plane of said sphere is adjacent said interface during operation of the float control.

5. The invention as claimed in claim 3, in which said float control is combined with and provided in a fuel-water separation system including a filter-separator tank, a water drain valve for draining water from the lower portion of said tank, and a fuel valve for preventing outflow of fuel from said tank to a point of use, and in which said water drain valve and said fuel valve are said valve means operated by said control means.

6. A float control for a system for separating water from aviation fuel, said system having fuel and water valves, said float control comprising:
   (a) control valve means constructed and arranged to be mounted adjacent a sump portion of a filter-separator tank of said system,
   (b) a float arm connected to said control valve means and constructed and arranged to extend into said sump portion,
      said float arm and control valve means being so associated that said float arm rotates upwardly and downwardly and thereby operates said control valve means,
   (c) a float element connected to said arm and constructed and arranged to be present in said sump portion to cause said upward and downward float arm rotation,
   (d) a weight mounted on said float arm between said float element and said control valve means,
      said weight having such magnitude, and such moment arm relative to the axis of rotation of said float arm, that it causes in combination with the weight of said float arm and the weight of said float element, said float element to float in said sump portion at an interface between water and aviation fuel therein, and
   (e) means, independent of said float arm and of said float element, to lift said weight off said float arm in order to test said float element and test the fuel and water valves of said system.

7. The invention as claimed in claim 6, in which a weight arm is connected to said weight to stabilize it during normal operation of the float control, and to lift it off said float arm to test the float control, and in which means are provided to operate said weight arm to lift said weight off said float arm and subsequently reposition said weight on said float arm, said weight arm and said weight arm-operating means being said lifting means.

8. The invention as claimed in claim 7, in which said weight arm is mounted to rotate about the same axis as said float arm.

9. The invention as claimed in claim 8, in which means are provided to isolate said weight arm from float arm to prevent direct lifting of said float arm and consequent operation of said control valve means by said weight arm, whereby said float arm moves upwardly only in response to floating of said float element.

10. The invention as claimed in claim 8, in which said means to operate said weight arm is a weight-actuating crank that moves an actuating element into engagement with the underside of said weight arm to lift the same.

11. The invention as claimed in claim 10, in which means are provided to create a single pivot axis for said weight arm and said float arm, whereby said weight-actuating crank rotates about the same axis of rotation as that of said weight arm and said float arm.

12. The invention as claimed in claim 10, in which means are provided to permit manual movement of said weight-actuating crank to a stowed position at which it is unlikely to be accidentally engaged by any operator.

13. The invention as claimed in claim 6, in which said float control is combined with, and said float element and said float arm are disposed in, a sump portion of a pressurized filter-separator tank of a fuel-water separation system, said system further including a water drain valve for draining water from said sump portion, and a fuel valve for preventing outflow of fuel from said tank to a point of use, and in which means are provided to connect said control valve means to said water drain valve and said fuel valve, said control valve means causing opening of said water drain valve when said float element is at a predetermined relatively low position, and causing closing of said fuel valve when said float element is at a predetermined relatively high position.

14. The invention as claimed in claim 6, in which said control valve means has a substantially horizontal stem, in which said float arm is connected to said stem to operate it rotationally, in which control valve elements are connected to said stem for operation in response to rotation of said stem, in which a shaft is mounted coaxially of said stem on the opposite side of said float arm from said control valve elements, in which an end portion of said stem is rotatably mounted coaxially in said shaft at one end portion thereof in such manner that rotation of said shaft does not directly rotate said stem, in which a weight arm is rotatably associated with said shaft and extends substantially parallel to said float arm and is connected to said weight, in which means are provided on said shaft at the portion thereof remote from said control valve elements to rotate said shaft, and in which means are provided on said shaft to engage the underside of said weight arm to elevate said weight arm in response to rotation of said shaft.

15. The invention as claimed in claim 14, in which said shaft-rotating means is a crank constructed and arranged to be stowed adjacent the sump portion and simultaneously shift said weight arm actuating means well away from said weight arm.

16. A method of separating water from aviation fuel, which comprises:
(a) delivering highly-pressurized aviation fuel to a filter separator tank,
(b) providing a float element in the bottom of said tank,
(c) causing said float element to be sufficiently buoyant that it will float in said fuel,
(d) associating said float element with a weight that is sufficiently heavy to cause said float element to float at an interface between said fuel and water that is separated from said fuel by said filter separator tank and therefore collects at the bottom of said tank,
(e) associating said float element with valve means that shut off the flow of fuel out of said tank when said interface rises to a predetermined level, and that drain water from said tank when said float element rises to a predetermined level,
(f) periodically discontinuing the association between said float element and said weight,
(g) determining whether or not said float element rises in response to said discontinuing, and
(h) employing the presence or absence of said rising as the criterion determining whether or not said float element has waterlogged.

17. The invention as claimed in claim 16, in which said method further comprises so selecting the weight of said weight that said float element, when said weight is associated therewith, floats at such a level that substantially half the volume of said float element is above said interface, and substantially half the volume of said weight is below said interface.

18. A float, weight and control system for increasing the reliability of a fuel-water separator system, said fuel-water separator system comprising a filter-separator tank containing high-pressure aviation fuel and further comprising fuel valve means to control the outflow of said high-pressure fuel from said filter-separator tank, said float, weight and control system comprising:
(a) float means constructed and arranged to be mounted in the lower portion of said filter-separator tank,
said float means being sufficiently light that it will float in said aviation fuel,
(b) weight means associated with said float means to increase the effective weight thereof,
said weight means being sufficiently heavy that said float means will not float in said aviation fuel when said weight means is associated with said fuel means,
said weight means being sufficiently light that said float means will float in water when said weight means is associated with said float means,
whereby said float means floats at an interface between fuel and water in said lower portion of said filter-separator tank during periods when there is water in said lower portion of said filter-separator tank,
said weight means being constructed and arranged to be dissociated from said float means,
(c) control means associated with said float means for operation thereby,
said control means being constructed and arranged to be connected to said fuel valve means and to operate said fuel valve means to closed condition when the level of said interface becomes excessively high, and
(d) float-test means independent of said float means operable from the exterior of said filter-separator tank to dissociate said weight means from said float means so that said float means will float up in said fuel from said interface provided the buoyancy of said float means has not diminished due to waterlogging thereof.

19. The invention as claimed in claim 18, in which said control means is pilot-valve means.

20. The invention as claimed in claim 18, in which the weight of said weight means and the association of said weight means with said float means are such that, when said weight means is dissociated from said float means, there is simulated in said float means the change in flotation or buoyancy forces that would occur if said float means were changed from floating in water to floating in said fuel.

21. A high-pressure fuel-water separator system, said system comprising:
 (a) a filter-separator tank containing high-pressure aviation fuel and further containing water that has been separated from said aviation fuel by said filter-separator tank,
 (b) fuel valve means to control the outflow of said high-pressure fuel from said filter-separator tank,
 (c) water valve means to drain water from the bottom of said tank,
 (d) float means mounted in the lower portion of said filter-separator tank,
  said float means being sufficiently light that it will float in said aviation fuel,
 (e) weight means associated with said float means to increase the effective weight thereof,
  said weight means being sufficiently heavy that said float means will not float in said aviation fuel when said weight means is associated with said float means,
  said weight means being sufficiently light that said float means will float in water when said weight means is associated with said float means,
   whereby said float means floats at an interface between fuel and water in said lower portion of said filter-separator tank during periods when there is water in said lower portion of said filter-separator tank,
  said weight means being adapted to be dissociated from said float means,
 (f) control means associated with said float means for operation thereby,
  said control means being connected to said fuel valve means operating said fuel valve means to closed condition when the level of said interface becomes excessively high, said control means being connected to said water valve means and operating said water valve means to open condition when the level of said interface becomes excessively high, and
 (g) float-test means independent of said float means operable from the exterior of said filter-separator tank to dissociate said weight means from said float means so that said float means floats up in said fuel from said interface provided the buoyancy of said float means has not diminished due to waterlogging thereof.

* * * * *